March 9, 1943.    H. A. BORTZ    2,313,510
REFRIGERATED CABINET
Filed Nov. 23, 1940    2 Sheets-Sheet 1

INVENTOR
Harry A. Bortz
by his attys.
Stebbins and Blenko

March 9, 1943.　　　　　H. A. BORTZ　　　　　2,313,510
REFRIGERATED CABINET
Filed Nov. 23, 1940　　　　2 Sheets-Sheet 2

INVENTOR
Harry A. Bortz
by his attys
Stebbins and Blenko

Patented Mar. 9, 1943

2,313,510

UNITED STATES PATENT OFFICE 2,313,510

REFRIGERATED CABINET

Harry A. Bortz, Pittsburgh, Pa.

Application November 23, 1940, Serial No. 366,871

4 Claims. (Cl. 62—89.5)

This invention relates to improvements in a refrigerated cabinet. More particularly, it relates to a cabinet for the storage and display of perishable food products. It is particularly useful for the storage and display of fresh fish and, therefore, it will be described with reference thereto.

For proper preservation, fresh fish must be stored in or displayed on crushed ice at temperatures which are slightly above freezing. If fresh fish are stored at a below freezing temperature so that the fish are slowly frozen, their taste is destroyed. Also, if fresh fish are stored in a cabinet cooled by ordinary mechanical refrigeration, the fish are dried out because mechanical refrigeration dehydrates the air which is being cooled. However, the storage or display of fresh fish in crushed ice is relatively expensive, costing from 2½¢ to 4¢ per pound of fish per day.

I have invented a display and storage cabinet which combines the advantages arising from the use of crushed ice and the low operating cost of mechanical refrigeration. The fish are stored and displayed in crushed ice. Mechanical refrigeration is used to supply the ice and to retard the melting of the ice. A compartment having a temperature below freezing is also provided for the storage of frozen fish.

Figure 1:
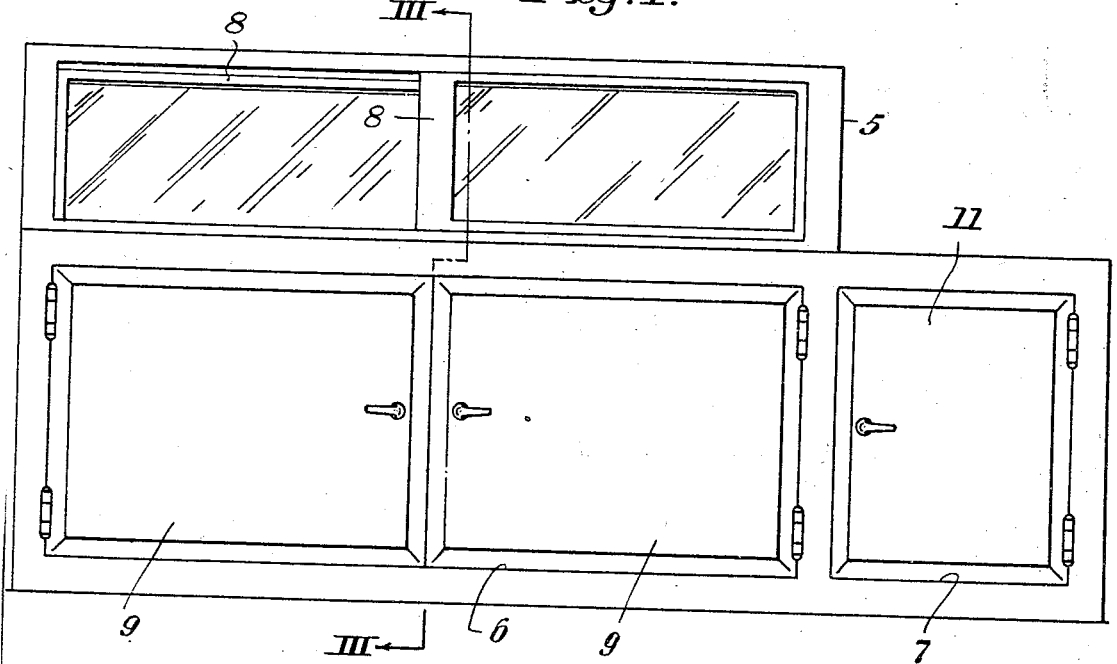
Figure 2:
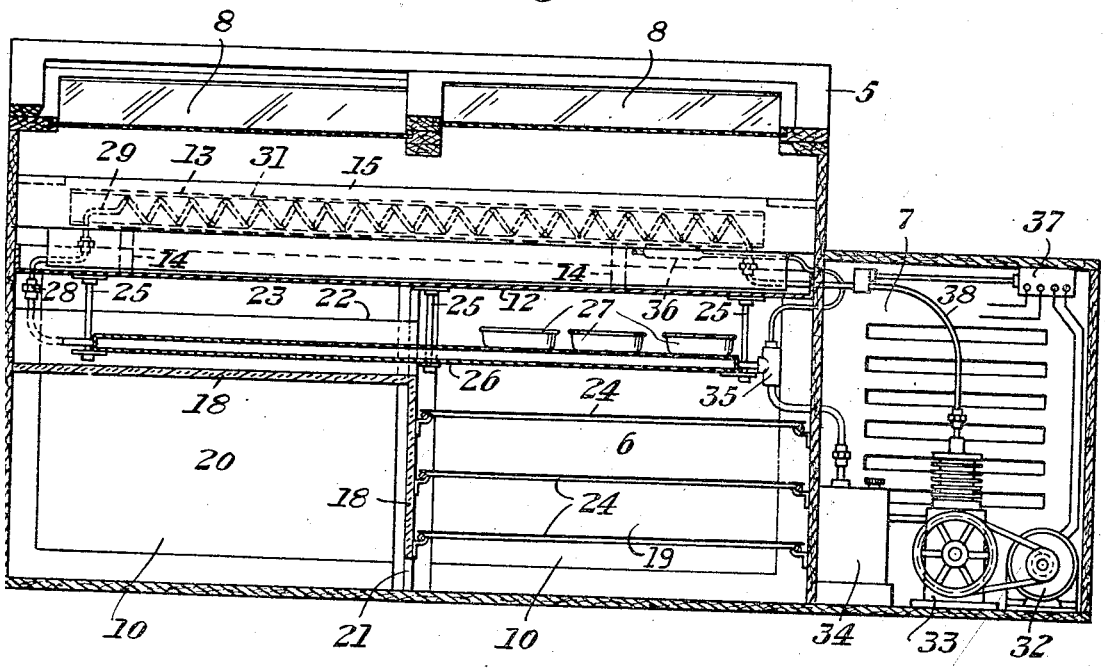
Figure 3:
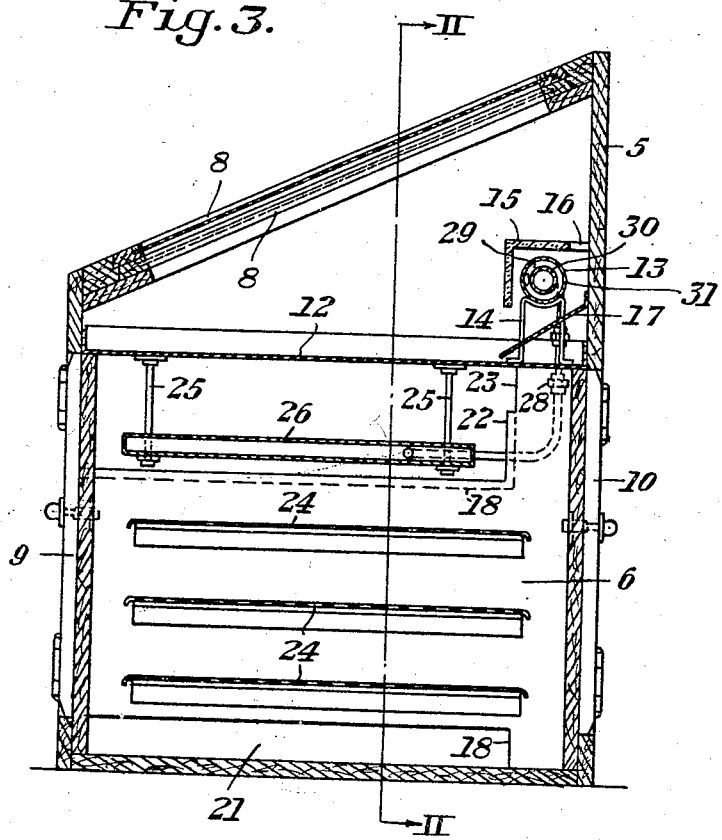
Figure 4:
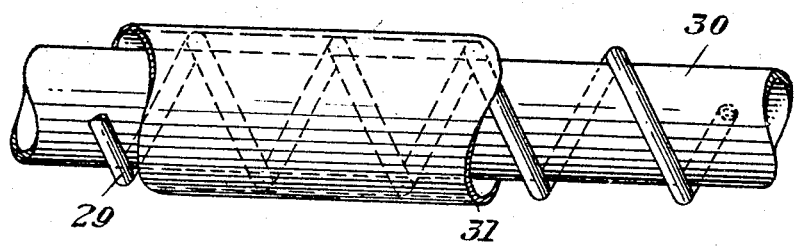

In the accompanying drawings I have illustrated a present preferred embodiment of my invention in which Figure 1 is a front view of a cabinet constructed according to my invention, and Figure 2 is a vertical section along the lines II—II of Figure 3, and Figure 3 is a cross section along the lines III—III of Figure 1, and Figure 4 is an elevation, partly broken away, of a cooling coil utilized in my cabinet.

As shown in Figure 1, my cabinet is of usual construction having a display compartment 5, a storage compartment 6, and an auxiliary compartment 7 which houses the refrigerant condensing unit. The display compartment 5 has sliding glass doors 8. The storage compartment 6 has front doors 9 and (as shown in Figures 2 and 3) rear doors 10. Access to the refrigerant condensing unit is provided by the door 11. The walls of the display and storage compartments are of the usual wood construction lined with a corrosion-resistant metal.

Figures 2 and 3 illustrate the apparatus by which the display and storage compartments are kept at the proper temperatures. The cabinet is divided into the two compartments by a pan or deck 12 which extends horizontally the entire length and width of the cabinet. This pan is designed to hold crushed ice on which the fish or other perishable food products are placed for display in the display compartment. The display compartment is also cooled by a cooling coil 13 which extends substantially the entire length of the display compartment and is supported by brackets 14. The cooling coil is covered by a heat insulating baffle 15 which has a horizontal slot 16 next to the rear wall of the compartment. An inclined drip pan 17 is placed under the cooling coil. The construction and operation of the cooling coil 13 will be hereinafter described.

The storage compartment 6 is divided by a heat insulating baffle 18 into two chambers 19 and 20. The baffle 18 extends horizontally for a portion of the length of the cabinet and thence downwardly towards the bottom of the compartment leaving a small slot 21 between it and the bottom of the cabinet. It also extends from the front doors 9 to within a short distance of the rear doors 10. The rear edge of the baffle 18 carries an upwardly extending wall 22 which does not extend all the way to the bottom of the ice pan 12 but leaves a slot 23 between it and the bottom of the ice pan. The downwardly extending wall of the baffle 18 also provides support at one end for wire shelves 24 in the chamber 19 of the storage compartment.

Hangers 25 carried by the ice pan 12 support a flat rectangular shaped refrigerating shelf 26. As is shown in Figures 2 and 3 of the drawings, the refrigerating shelf is held in a horizontal position between the baffle 18 and the ice pan 12 so that it is insulated by the baffle 18 and the upwardly extending wall 22 from the chamber 20 and extends out into the chamber 19. Water pans 27 may be placed on the refrigerating shelf 26 to make ice for use in the display compartment of the cabinet.

The refrigerating shelf 26 is of standard construction and preferably has passages therein for the passage of liquid refrigerant which are approximately ⅝" in diameter. The outlet of the refrigerating shelf is connected through a reducing union 28 to a pipe 29 for carrying refrigerant through the cooling coil 13. This coil is of special construction. As is shown in Figure 4, the coil comprises a tube 30 around which the pipe 29 is sparsely wound. The pipe 29 is encased in a second tube 31 concentric with the tube 30. Preferably the pipe 29 is soldered to the tube 30 but not to the tube 31. In making the cooling coil I have found it advantageous to use a ¼" copper tubing for the pipe 29 and to wind it so that it completes approximately two complete turns around the tube 30 per foot of length of the tube. The purpose of this construction is to provide a cooling unit in which a large metallic area is exposed to the atmosphere being cooled in proportion to the quantity of refrigerant passing through the unit.

To supply liquid refrigerant to the refrigerating shelf 26 and the cooling coil 13, I provide a refrigerant condensing unit of usual construction having an electric motor 32, a compressor 33, a receiver 34, a thermostatic expansion valve 35 actuated by a thermoresponsive liquid contained in a bulb 36, and a pressure actuated electric switch 37.

The refrigerating shelf 26 and the cooling coil 13 are designed to operate on the following cycle: Liquid refrigerant from the receiver 34 passes through the expansion valve 35 where it begins to vaporize and thus creates a low temperature. Liquid refrigerant then passes through the reducing union 28 into the pipe 29 of the cooling coil 13. Since the diameter of the pipe 29 is less than the diameter of the outlet of the refrigerating shelf 26, the flow of refrigerant through the refrigerating shelf is restricted and the freezing shelf remains flooded with liquid refrigerant. This increases the cooling efficiency of the shelf. Liquid refrigerant passes through the cooling coil 13 and thereby cools the air in the display compartment. From the cooling coil 13 the refrigerant flows back to the compressor 33 through a pipe 38.

The thermostatic expansion valve 35 is so adjusted that the formation of a very little frost on the cooling coil 13 and the bulb 36 will cut off the flow of refrigerant to the refrigerating shelf 26. The cutting off of the refrigerant by the valve 35 will decrease the pressure in the return pipe 38. This reduced pressure will, in turn, actuate the electric switch 37 and turn off the motor 32. As a result of this regulation, practically no frost is formed on the cooling coil 13. Therefore, the air in the display compartment is not dehydrated and fish or other perishable food products in the compartment are not dried out. At the same time, the cooling coil 13 retards the melting of the ice in the pan 17 by creating a current of air which passes down from the coil over the ice, back up along the top of the compartment and down through the slot 16 in the baffle 15 to the cooling coil.

The refrigerating shelf 26 likewise causes a current of cooling air to pass through the chambers 19 and 20 of the storage compartment of the cabinet. Thus, a current of cold air will pass down through the chamber 19 through the slot 21 under the baffle 18, and up through the chamber 20. From the chamber 20, the air passes around the wall 22 (see Figure 3) through the slot 23 and back to the refrigerating shelf 26.

A preferred temperature range for the cooling cycles just described is as follows: The refrigerating shelf 26 is maintained at a temperature approximately 5° below zero. If this temperature is maintained, the temperature of the chamber 19 will be approximately 25° to 26° above zero and packaged frozen fish may be kept on the shelves 24. The temperature of the chamber 20 will be approximately 36° above zero and the chamber can be used to store fresh fish which comes packed in crushed ice. This temperature will permit the ice to melt slowly and to keep the stored fresh fish moist. The temperature of the display compartment will vary between 35° and 40°. This temperature will retard the melting of the ice and at the same time will prevent the formation of frost on the cooling coil 13 and thus prevent dehydration of the air in the display compartment.

A cabinet thus constructed in accordance with my invention greatly reduces the cost of preserving perishable food products, particularly fresh fish. By connecting the refrigerating shelf 26 and the cooling coil 13 in series through a reducing union and by the use of a baffle 18, I can provide a combined display and storage cabinet having compartments in which different temperatures are maintained and in one of which ice for use in the display compartment can be manufactured. The cooling cycle which I have devised may be maintained without the use of any special valves or regulators. The supply of liquid refrigerant is maintained and regulated by a single standard liquid refrigerant condensing unit and by the use of only one standard control valve.

As stated in the first part of the specification, my cabinet is particularly advantageous for the display and storage of fresh fish. The fresh fish may be stored and displayed in crushed ice which has been found to be the only feasible manner. At the same time, the cost of using crushed ice is greatly reduced. Thus, I have estimated (considering the cost of the equipment as an investment over a period of ten years) that the cost of storing and displaying fresh fish will amount to approximately ½¢ per pound per day as compared to 2½¢ to 4¢ per pound per day, the cost of using ice alone.

While I have described a present preferred embodiment of my invention, it is to be distinctly understood that it is not limited thereto but may be otherwise variously embodied within the scope of the following claims.

I claim:

1. A refrigerated cabinet having an upper display compartment and a lower storage compartment, a horizontally extending pan dividing the cabinet into the two compartments and capable of holding ice on which articles may be displayed in the display compartment, a cooling coil in the display compartment, a heat insulating baffle extending horizontally below the ice pan for a portion of the length of the cabinet and thence downwardly towards the bottom of the cabinet to divide the storage compartment into two chambers, and a cooling unit positioned between the ice pan and the baffle and extending into one of the chambers.

2. A refrigerated cabinet having an upper display compartment and a lower storage compartment, a horizontally extending pan dividing the cabinet into the two compartments and capable of holding ice on which articles may be displayed in the display compartment, a heat insulating baffle extending horizontally below the ice pan for a portion of the length of the cabinet and thence downwardly towards the bottom of the cabinet to divide the storage compartment into two chambers, and a flat rectangular shaped heat exchange unit positioned horizontally between the ice pan and the baffle and extending into one of the chambers.

3. A refrigerated cabinet having two compartments arranged one above the other, a deck completely separating the two compartments and capable of holding ice on which articles may be displayed in the upper compartment, a heat insulating baffle dividing the lower compartment into two chambers, a cooling unit in the lower compartment and separated from one of the chambers by the baffle, said baffle providing passageways through which air may flow from one chamber to the other.

4. A refrigerated cabinet having an upper display compartment and a lower storage compartment, a horizontally extending pan dividing the cabinet into the two compartments and capable of holding ice on which articles may be displayed in the display compartment, a cooling coil in the display compartment, a heat insulating baffle below the ice pan and dividing the storage compartment into two chambers, said baffle extending from a point adjacent the ice pan to a point adjacent the bottom of the lower compartment whereby air may flow above and below the baffle and circulate in the two chambers and a cooling unit in one of the chambers formed by the baffle.

HARRY A. BORTZ.